(12) United States Patent
Sparks et al.

(10) Patent No.: US 7,263,882 B2
(45) Date of Patent: Sep. 4, 2007

(54) FLUID SYSTEM AND METHOD OF ASSESSING A PROPERTY OF A FLUID FLOWING THEREIN

(75) Inventors: Douglas Ray Sparks, Whitmore Lake, MI (US); Nader Najafi, Ann Arbor, MI (US)

(73) Assignee: Integrated Sensing Systems, Inc., Ypsilanti, MI (US)

( * ) Notice: Subject to any disclaimer, the term of this patent is extended or adjusted under 35 U.S.C. 154(b) by 0 days.

(21) Appl. No.: 11/420,491

(22) Filed: May 26, 2006

(65) Prior Publication Data

US 2006/0213552 A1 Sep. 28, 2006

Related U.S. Application Data

(63) Continuation-in-part of application No. 11/164,374, filed on Nov. 21, 2005.

(60) Provisional application No. 60/684,314, filed on May 26, 2005, provisional application No. 60/656,814, filed on Feb. 28, 2005, provisional application No. 60/649,105, filed on Feb. 3, 2005.

(51) Int. Cl.
*G01F 1/68* (2006.01)
(52) U.S. Cl. .................................. 73/204.26
(58) Field of Classification Search ............. 73/204.26, 73/862.352, 204.25, 204.23, 861.355, 861.04
See application file for complete search history.

(56) References Cited

U.S. PATENT DOCUMENTS

| | | | |
|---|---|---|---|
| 4,109,524 A | 8/1978 | Smith | |
| 4,187,721 A | 2/1980 | Smith | |
| 4,491,025 A | 1/1985 | Smith et al. | |
| 4,729,243 A * | 3/1988 | Friedland et al. | 73/861.355 |
| 4,945,880 A | 8/1990 | Gonze et al. | |
| 5,150,683 A | 9/1992 | Depa et al. | |
| 5,335,637 A | 8/1994 | Davis et al. | |
| 5,469,747 A | 11/1995 | Carlisle et al. | |
| 5,497,753 A | 3/1996 | Kopera | |
| 5,717,136 A * | 2/1998 | Aoi et al. | 73/204.26 |
| 5,787,864 A | 8/1998 | Collier, Jr. et al. | |
| 5,941,217 A | 8/1999 | Cheng et al. | |
| 5,969,264 A * | 10/1999 | Rivkin | 73/861.356 |
| 6,164,140 A * | 12/2000 | Kalinoski | 73/861.357 |
| 6,471,487 B2 | 10/2002 | Keilty et al. | |
| 6,477,901 B1 | 11/2002 | Tadigadapa et al. | |

(Continued)

*Primary Examiner*—Jewel Thompson
(74) *Attorney, Agent, or Firm*—Gary M. Hartman; Domenica N. S. Hartman; Hartman & Hartman, P.C.

(57) ABSTRACT

A fluid system installed on a vehicle and a method for assessing a property of a fluid flowing in the fluid system. The fluid system and method entail flowing at least a portion of the fluid through a passage within a freestanding portion of a micromachined tube supported above a substrate so as to define a gap therebetween, vibrating the freestanding portion of the micromachined tube at a resonant frequency thereof, sensing the movement of the freestanding portion of the micromachined tube so as to measure at least one of the vibration frequency and deflection of the freestanding portion relative to the substrate and produce therefrom at least one output corresponding to at least one of the mass flow rate, specific gravity, and density of the portion of the fluid flowing through the passage, and then using the output to compute the property of the fluid.

38 Claims, 5 Drawing Sheets

U.S. PATENT DOCUMENTS

| | | |
|---|---|---|
| 6,647,778 B2 | 11/2003 | Sparks |
| 6,672,340 B2 | 1/2004 | Mutter |
| 6,708,573 B1 | 3/2004 | Cohen et al. |
| 6,714,856 B2 | 3/2004 | Huff et al. |
| 6,851,416 B1 | 2/2005 | DeWitte et al. |
| 6,932,114 B2 | 8/2005 | Sparks |
| 6,997,172 B2 | 2/2006 | Oshimi et al. |
| 2004/0171983 A1 | 9/2004 | Sparks et al. |
| 2004/0255648 A1 | 12/2004 | Sparks |
| 2005/0000802 A1 | 1/2005 | Hobbs |
| 2005/0037246 A1 | 2/2005 | Hunkel et al. |
| 2005/0126304 A1 | 6/2005 | Sparks et al. |
| 2005/0235759 A1 | 10/2005 | Sparks et al. |
| 2005/0284815 A1 | 12/2005 | Sparks et al. |
| 2006/0010964 A1 | 1/2006 | Sparks et al. |

* cited by examiner

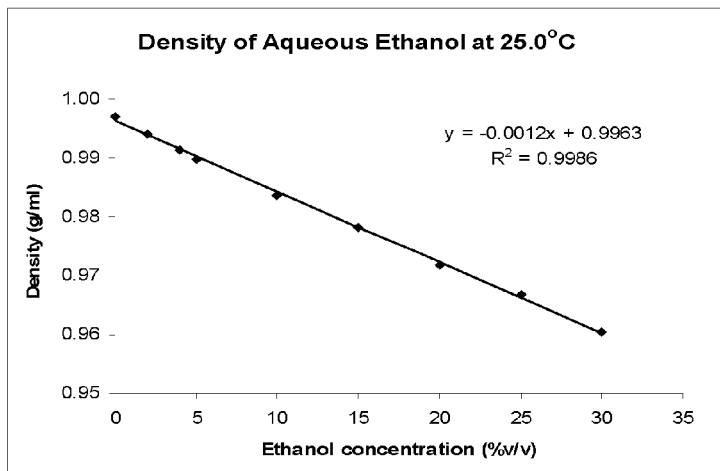
FIG. 9
FIG. 10
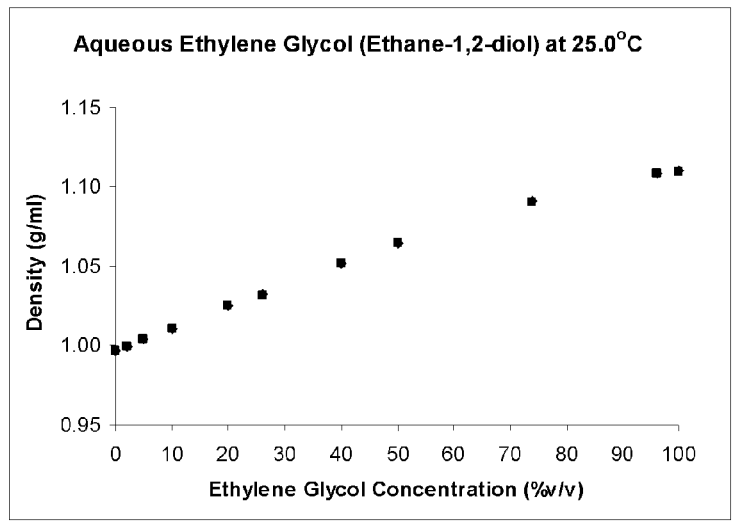
FIG. 11
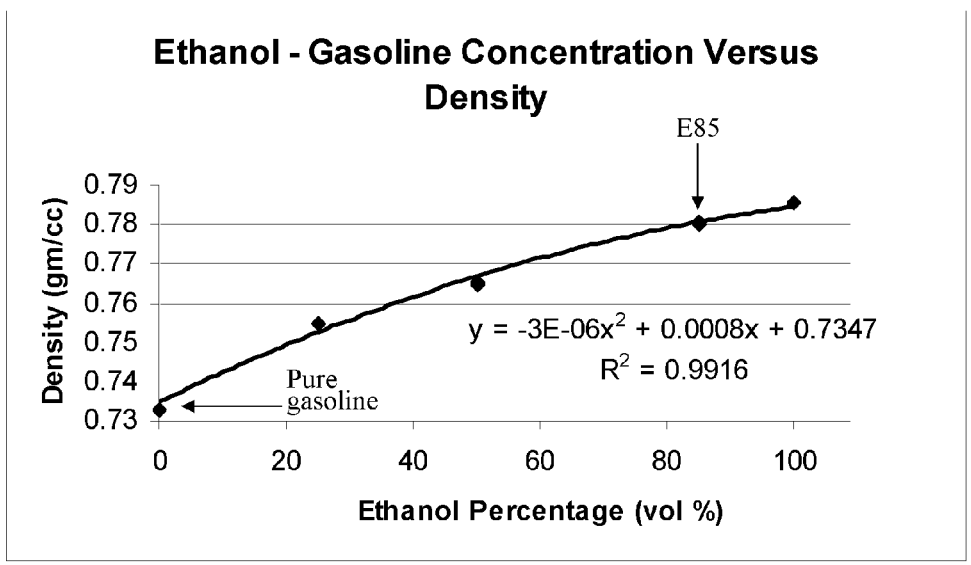

FLUID SYSTEM AND METHOD OF ASSESSING A PROPERTY OF A FLUID FLOWING THEREIN

CROSS REFERENCE TO RELATED APPLICATIONS

This application claims the benefit of U.S. Provisional Application No. 60/684,314, filed May 26, 2005. In addition, this is a continuation-in-part patent application of co-pending U.S. patent application Ser. No. 11/164,374, filed Nov. 21, 2005, which claims the benefit of U.S. Provisional Application No. 60/649,105, filed Feb. 3, 2005, and U.S. Provisional Application No. 60/656,814, filed Feb. 28, 2005. The contents of these prior applications are incorporated herein by reference.

BACKGROUND OF THE INVENTION

The present invention generally relates to fluid sensing devices and methods of using such devices. More particularly, this invention relates to a fluid system installed on a vehicle and the use of a micromachined tube to assess one or more properties of a fluid flowing in the fluid system.

A variety of sensors have been used in land-based, aerospace, and aquatic-based vehicles to enhance engine performance and safety. For example, pressure sensors are used in a variety of passenger vehicles to monitor engine air intake, engine cylinder, engine oil, and tire pressures, and to detect fuel vapor leaks. Other examples include the use of hot-wire flow sensors and drag-force sensors to measure air intake flow rates, oxygen sensors to monitor oxygen levels in engine exhaust gases, and accelerometers and gyroscopes used in vehicle safety systems. More recently, certain alternative fuels used in automotive applications require the use of fuel systems capable of monitoring fuel constituents. Notable examples include flex fuels that contain about 85% ethanol (E85) or methanol (M85) with the balance (about 15%) essentially gasoline, and reformed fuel cells that often employ alcohol/water solutions. Measuring the concentration of two liquid fuel constituents is a common theme in these alternative fuel systems. For example, flex fuel engines benefit from the ability to distinguish between pure gasoline and the alternative fuel (E85 or M85). If gasoline and the alternative fuel are mixed in the same fuel tank, a measure of the ethanol/methanol or gasoline concentration can be used to optimize the engine operating parameters for performance. A capacitive sensor is disclosed in U.S. Pat. No. 5,497,753 as being capable of such use. However, sensor with improved concentration resolution would be desirable.

BRIEF SUMMARY OF THE INVENTION

The present invention provides a fluid system installed on a vehicle and a method for assessing a property of a fluid flowing in the fluid system.

According to a first aspect of the invention, the method includes flowing at least a portion of the fluid through a passage within a freestanding portion of a micromachined tube supported above a substrate so as to define a gap therebetween, vibrating the freestanding portion of the micromachined tube at a resonant frequency thereof, sensing the movement of the freestanding portion of the micromachined tube so as to measure at least one of the vibration frequency and deflection of the freestanding portion relative to the substrate and produce therefrom at least one output corresponding to at least one of the mass flow rate, specific gravity, and density of the portion of the fluid flowing through the passage, and then using the output to compute the property of the fluid. The computed property of the fluid can then be used to modify the fluid system and/or vehicle, for example, modify its operation to improve efficiency, performance and/or safety, signal the status of the fluid system, etc.

According to a second aspect of the invention, the fluid system includes means for flowing at least a portion of the fluid through a passage within a freestanding portion of a micromachined tube supported above a substrate so as to define a gap therebetween, means for vibrating the freestanding portion of the micromachined tube at a resonant frequency thereof, means for sensing the movement of the freestanding portion of the micromachined tube so as to measure at least one of the vibration frequency and deflection of the freestanding portion relative to the substrate and produce therefrom at least one output corresponding to at least one of the mass flow rate, specific gravity, and density of the portion of the fluid flowing through the passage, means for using the output to compute the property of the fluid, and means for using the computed property of the fluid to modify the fluid system and/or vehicle.

The method and fluid system of this invention are well suited for a variety of applications, such as determining the volumetric flow rate, mass flow rate, specific gravity, and/or density of the fluid. The determination of such properties can be used to obtain the relative chemical concentrations of constituents of the fluid, and detect the presence of undesirable constituents such as gas bubbles in a liquid, solid particles in a liquid or gas, etc. Notable examples include the sensing of fuel concentrations in fuel mixtures for fuel systems, such as fuel cell systems and flex fuels such as E85 (ethanol/gasoline mixtures of about 85% ethanol and about 15% gasoline) and M85 (methanol/gasoline mixtures of about 85% methanol and about 15% gasoline) used in a variety of vehicles, including but not limited to land-based, aerospace, and aquatic-based vehicles.

Other objects and advantages of this invention will be better appreciated from the following detailed description.

BRIEF DESCRIPTION OF THE DRAWINGS

FIGS. 9 through 11 are graphs plotting concentrations of fuels obtained with fluid sensing devices of the type shown in FIG. 1.

DETAILED DESCRIPTION OF THE INVENTION

Figure 1:
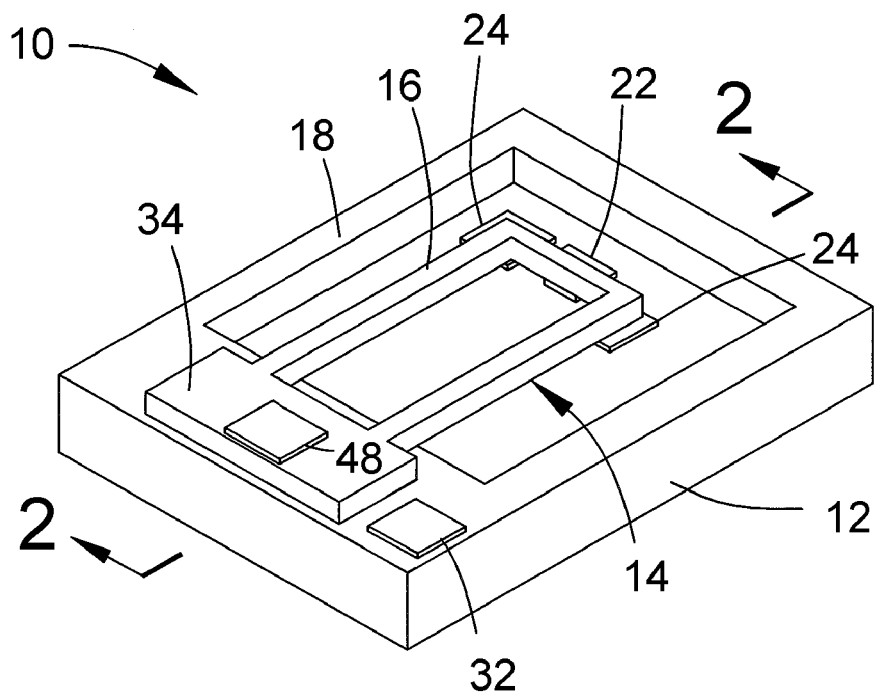
FIG. 1 is a perspective view of a fluid sensing device in accordance with a preferred embodiment of this invention.

FIG. 1 represents a fluid sensing device 10 of a type disclosed in commonly-assigned U.S. Pat. No. 6,477,901 to Tadigadapa et al., and suitable for use with the present invention. Tadigadapa et al., whose contents relating to the fabrication and operation of a Coriolis-based sensor are incorporated herein by reference, disclose processes and designs for flow sensing devices of the type shown in FIG. 1 using micromachining techniques. As used herein, micromachining is a technique for forming very small elements by bulk etching a substrate (e.g., a silicon wafer), or by surface thin-film etching, the latter of which generally involves depositing a thin film (e.g., polysilicon or metal) on a sacrificial layer (e.g., oxide layer) on a substrate surface and then selectively removing portions of the sacrificial layer to free the deposited thin film. In the processes disclosed by Tadigadapa et al., wafer bonding and silicon etching techniques are used to produce microelectromechanical systems (MEMS) comprising one or more suspended micromachined tubes through which fluid flows. The tube is vibrated at or near resonance, by which certain properties of the fluid, such as flow rate and density, can be ascertained using Coriolis force principles. Sensors of the type taught by Tadigadapa et al. have found use in a variety of applications, as evident from commonly-assigned U.S. Pat. Nos. 6,647,778 and 6,932,114 and U.S. Patent Application Publication Nos. 2004/0171983, 2004/0255648, 2005/0126304, 2005/0235759, 2005/0284815, and 2006/0010964. Notable advantages of these sensors include the extremely miniaturized scale to which they can be fabricated and their ability to precisely analyze very small quantities of fluids. As will be understood from the following description, these advantages are also advantageous in the present invention.

In FIG. 1, the fluid sensing device 10 is represented as including a substrate 12 that may be formed of silicon or another semiconductor material, quartz, glass, ceramic, metal, a polymeric material, a composite material, etc. A tube 14 is supported by the substrate 12 so as to have a base 34 attached to a surface 18 of the substrate 12, and a freestanding portion 16 suspended above the substrate 12. Electrodes 22 and 24 are shown as being located on the substrate 12 beneath the freestanding portion 16 of the tube 14, and bond pads 32 (only one of which is shown) are provided for transmitting input and output signals to and from the device 10.

Figure 2:
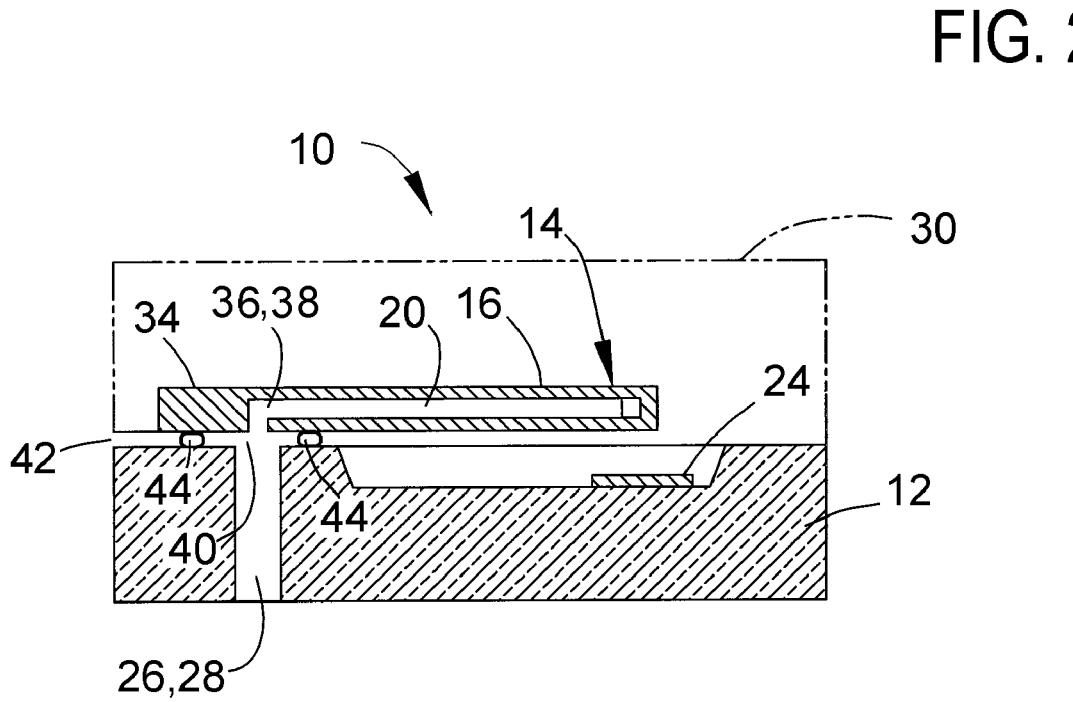
FIGS. 2, 3, 4, and 6 are cross-sectional views of the fluid sensing device of FIG. 1 in accordance with various embodiments of this invention.
Figure 3:
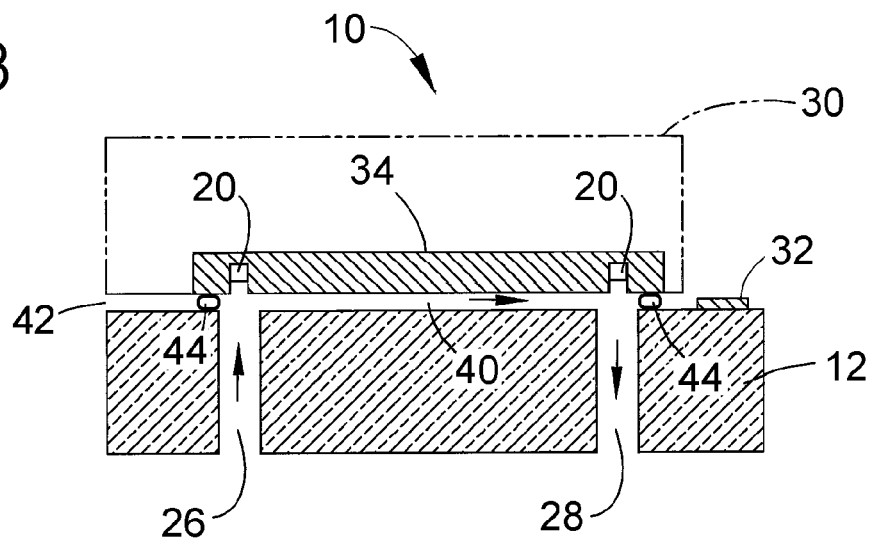

FIGS. 2 and 3 represent cross-sectional views of the fluid sensing device 10 in accordance with one embodiment of the invention (FIG. 3 corresponds to a cross-section of the device 10 transverse to the cross-section of FIG. 2). Fluid enters and leaves the device 10 through separate fluid inlet and outlet passages 26 and 28 (only one of which is seen in FIG. 2) in the substrate 12, and enters and leaves the tube 14 through separate fluid inlets and outlets 36 and 38 (only one of which is seen in FIG. 2) defined within the base 34 of the tube 14. A continuous passage 20 is present within the tube 14 and fluidically couples the tube inlet 36 to the tube outlet 38. According to a preferred aspect of the invention, the tube 14 is micromachined from silicon, doped silicon or another semiconductor material, silicon carbide, quartz or another glass material, ceramic materials, metallic materials, and composite materials. The substrate 12 and tube 14 are fabricated separately, after which the tube 14 is attached as a unitary member to the surface 18 of the substrate 12, as will be discussed in more detail below. The tube 14 serves as a conduit through which a fluid flows while the tube 14 is vibrated for the purpose of ascertaining certain properties of the fluid using Coriolis force principles in accordance with Tadigadapa et al. The freestanding portion 16 of the tube 14 is generally U-shaped, though other shapes—both simpler and more complex—are within the scope of this invention, such as straight, omega, S, or Z-shaped, etc.

The freestanding portion 16 is vibrated in a direction perpendicular to the surface 18 of the substrate 12, preferably at or near its resonant frequency. During half of the vibration cycle in which the tube 14 moves upward, the freestanding portion 16 has upward momentum as the fluid travels around the tube bends, and the fluid flowing out of the freestanding portion 16 resists having its vertical motion decreased by pushing up on that part of the freestanding portion 16 nearest the fluid outlet 38. The resulting force causes the freestanding portion 16 of the tube 14 to twist. As the tube 14 moves downward during the second half of its vibration cycle, the freestanding portion 16 twists in the opposite direction. This twisting characteristic is referred to as the Coriolis effect, and the degree to which the freestanding portion 16 of the tube 14 deflects during a vibration cycle as a result of the Coriolis effect can be correlated to the mass flow rate of the fluid flowing through the tube 14, while the density of the fluid is proportional to the frequency of vibration. The resonant frequency of the tube 14 is controlled by its mechanical design (shape, size, construction and materials). Typical resonant frequencies for the micromachined tube 14 represented in FIG. 1 will generally be in the range of about 1 kHz to about 100 kHz. The amplitude of vibration is adjusted through the electrode 22 shown in FIG. 1 located beneath the tube 14 on the substrate 12. In the embodiment of FIGS. 1 and 2, the tube 14 is formed of doped silicon and can therefore serve as an electrode that can be capacitively coupled to the electrode 22, enabling the electrode 22 to capacitively (electrostatically) drive the tube 14. However, it is foreseeable that the tube 14 could be formed of a nonconductive material, and a separate electrode formed on the tube 14 opposite the electrode 22 for vibrating the tube 14 electrostatically. An alternative driving technique is to provide a piezoelectric element on an upper surface of the tube 14 to generate alternating forces in the plane of the tube 14 that flex the freestanding portion 16 of the tube 14 in directions normal to the plane of the tube 14. Other alternatives are to drive the freestanding portion 16 of the tube 14 magnetically, thermally, or by another actuation technique. The remaining electrodes 24 shown in FIGS. 1 and 2 serve as sensing electrodes 24 for providing feedback to the drive electrode 22 to enable the vibration frequency to be controlled with appropriate circuitry (e.g., 64 in FIGS. 7 and 8) while also sensing the deflection of the tube 14 relative to the substrate 12. The sensing electrodes 24 can sense the tube 14 capacitively or in any other suitable manner capable of sensing the proximity or motion of the tube 14.

In FIG. 2, the fluid sensing device 10 is schematically shown as enclosed by a cap 30 to form a sensing package. The cap 30 allows for vacuum packaging that reduces air damping of the tube vibration. A variety of package and wafer-level methods exist and are well known for vacuum packaging electronic devices, and therefore will not be discussed here in any detail. Such methods include solder or weld hermetic packages, and wafer bonding using glass frit, solder, eutectic alloy, adhesive, and anodic bonding. A suitable material for the cap 30 is silicon, though it is foreseeable that a variety of other materials could be used including metals and glass materials, the latter including borosilicate glass (e.g., Pyrex). In the preferred embodiment of this invention, the bond between the cap 30 and the substrate 12 is hermetic, and the enclosure formed by the substrate 12 and cap 30 is evacuated to enable the tube 14 to be driven efficiently at high quality (Q) values without damping. In such an embodiment, a getter material is preferably placed in the enclosure to assist in reducing and maintaining a low cavity pressure. As an alternative to a hermetically sealed package, the tube 14 could be enclosed such that a vacuum can be drawn when desired through the use of a pump.

The device 10 is also shown in FIG. 2 as including a sensing element 48 for measuring the temperature of the fluid flowing through the tube 14. Properties such as densities of materials change with temperature, as do the Young's and shear moduli of materials. Placement of the temperature sensing element 48 on the base 34 of the tube 14 enables the temperature of the tube 14 and its fluid contents to be monitored with suitable accuracy under many operating conditions. A suitable construction for the sensing element 48 can make use of one or more metal layers of the type employed to form the electrodes 22, 24, and 32, and their associated conductive runners. For example, a resistive-based temperature sensing element 48 can be formed by a thin-film metal layer of platinum, palladium or nickel, in accordance with known practices. With the temperature sensing element 48, changes in mechanical properties of the tube 14 and properties of the fluid therein attributable to temperature changes can be compensated for with appropriate circuitry (not shown). Alternatively or in addition, an electrical potential could be applied to pass a current through the tube 14 to raise and maintain the temperature of the tube 14 and the fluid flowing therethrough by Joule heating, with the sensing element 48 used as feedback for appropriate control circuitry (not shown).

The shape and size of the tube 14 are preferably chosen to provide a suitable flow capacity and have suitable vibration parameters for the fluid to be evaluated with the fluid sensing device 10. Because micromachining technologies are employed to fabricate the tube 14, the size of the tube 14 can be extremely small, such as lengths of about 0.5 mm and cross-sectional areas of about 250 square micrometers, with smaller and larger tubes also being within the scope of this invention. Because of the ability to produce the tube 14 at such miniaturized sizes, the device 10 can be used to process very small quantities of fluid for analysis. However, because miniaturization can render the device 10 unsuited for applications in which measurements of properties are desired for a fluid flowing at relatively high flow rates, the device 10 is shown in FIG. 2 as being configured to have an internal bypass passage 40 having a cross-sectional flow area that is relatively larger than the cross-sectional flow area of the passage 20 within the tube 14. As evident from FIGS. 2 and 3, the bypass passage 40 is fluidically in parallel with the passage 20 through the tube 14, and therefore allows excess fluid entering the device 10 through the inlet passage 26 to be routed directly to the outlet passage 28 instead of to the tube 14.

In FIGS. 2 and 3, the bypass passage 40 is defined entirely by a gap 42 between the substrate surface 18 and the base 34 of the tube 14. In turn, the gap 42 is represented in FIGS. 2 and 3 as coinciding with and preferably determined by the height of a seal 44 between the base 34 and substrate surface 18. The seal 44 is preferably continuous and surrounds the openings of both passages 26 and 28 at the surface 18 of the substrate 12, and therefore also the inlet and outlet 36 and 38 to which the passages 26 and 28, respectively, are fluidically coupled. Suitable materials for the seal 44 include adhesives and solders that can be deposited on the substrate surface 18 or tube base 34, and discreet components such as O-rings, gaskets, washers, and compressed seals that can be individually placed and secured between the surface 18 and base 34. If an adhesive or solder, the seal 44 can be used to bond the base 34 to the substrate 12.

To provide a suitable bypass functionality, the bypass passage 40 preferably has a cross-sectional area greater than that of the passage 20 within the tube 12. While suitable control of the cross-sectional area of the passage 40 can be achieved for many applications solely by choosing an appropriate type of seal 44, a seal 44 formed by an adhesive or solder can benefit from beads or other particles of controlled and uniform size. By pressing the tube base 34 onto the substrate surface 18 until individual beads within the seal 44 are trapped between and contact both the base 34 and surface 18, the gap 42 (and therefore the height of the bypass passage 40) can be established by the diameter of the beads. Because the seal 44 defines the outermost boundaries of the bypass passage 40 in the plane of the substrate surface 18, the cross-sectional area of the passage 40 can be readily controlled through placement of the seal 44 relative to the openings of the passages 26 and 28 at the substrate surface 18.

Figure 4:
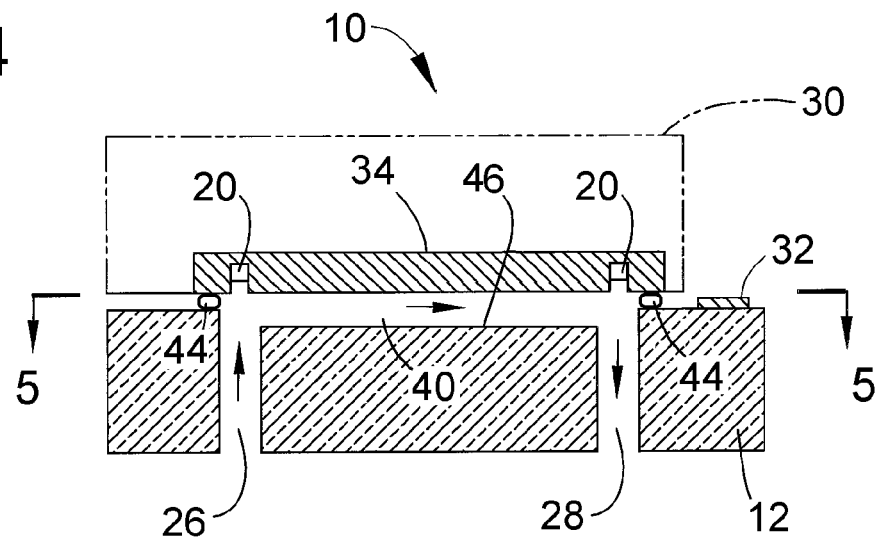
Figure 5:
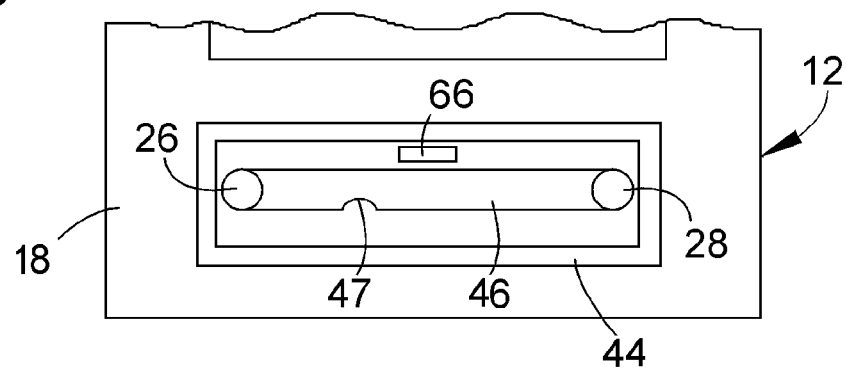
FIG. 5 is a partial cross-sectional view of the fluid sensing device of FIG. 4.

The cross-sectional area of the bypass passage 40 can be further increased by forming a recess in the substrate surface 18 between the passages 26 and 28 and/or the base 34 between the inlet 36 and outlet 38. FIGS. 4 and 5 illustrate such an embodiment, in which elements similar to elements of FIGS. 1 through 3 are identified with the same corresponding reference numbers. In FIGS. 4 and 5, a single recess 46 has been formed in the surface 18 of the substrate 12, with the recess 46 being continuous and interconnecting the openings to the passages 26 and 28 at the substrate surface 18. Depending on the material of the substrate 12, the recess 46 can be machined, molded, stamped, etched, or otherwise formed in the substrate surface 18. As evident from FIG. 4, the depth of the bypass passage 40 in the direction normal to the substrate surface 18 equals the sum of the width of the gap 42 and the depth of the recess 46 in the direction normal to the substrate surface 18. From FIG. 5, it can be seen that the seal 44 defines the outermost boundaries of the bypass passage 40 in the plane of the substrate surface 18. As such, the depth (in the direction normal to the substrate surface 18) and width (in the plane of the substrate surface 18) of the recess 46 can be selected to obtain a desired ratio for the amount of fluid that will flow through the tube 14 relative to the amount of fluid that will flow through the bypass passage 40 without changing the configuration or processing of the tube 14. To ensure that adequate flow occurs through the passage 20 of the tube 14, the recess 46 is shown in FIG. 5 as having a protrusion 47 that acts as a flow restrictor, thereby raising the pressure within the bypass passage 40. In addition or alternatively, the seal 44 could be configured to have a portion that protrudes toward the recess 46 to provide a similar function.

Figure 6:
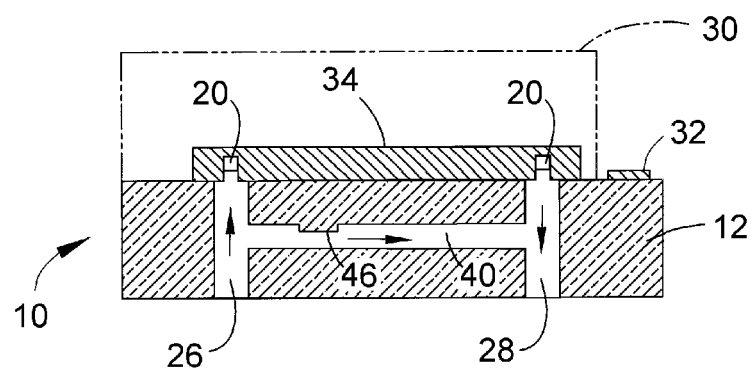

Finally, FIG. 6 represents an embodiment of the fluid sensing device 10 in which the internal bypass passage 40 of the device 10 is entirely within the bulk of the substrate 12. Consistent with the previous embodiments, the bypass passage 40 is fluidically in parallel with the passage 20 through the tube 14, and therefore allows excess fluid entering the device 10 through the inlet passage 26 to be routed directly to the outlet passage 28 instead of to the tube 14. As with the embodiment of FIG. 5, the bypass passage 40 is preferably formed to have a protrusion 46 that acts as a flow restrictor, thereby ensuring adequate flow through the passage 20 of the tube 14. The substrate 12 can generally be fabricated from a metal, glass, or plastic material and its features formed by machining, stamping, etc., though it is also foreseeable that the substrate 12 could be formed of a semiconductor material and its features formed by bulk etching or surface thin-film etching processes known in the art. Surface thin-film techniques can also be used to form the tube 14. An example is to form the tube 14 of layers deposited on a silicon wafer, bonding the wafer to the substrate 12 so that the base 34 of the tube 14 is bonded to the surface 18 of the substrate 12 and the freestanding portion 16 is suspended over a cavity etched in the surface 18 of the substrate 12, and then removing the wafer by selective etching. These and other potential micromachining techniques are well known in the art and within the scope of this invention. As with the previous configurations of this invention, placement of the bypass passage 40 within the device 10 is more compact than would be possible with a bypass outside the device 10, such as a bypass tube interconnecting tubes carrying the fluid to and from the inlet and outlet passages 26 and 28 of the substrate 12.

The devices 10 represented in FIGS. 1 through 6 can be used to evaluate a variety of fluids, including gases and liquids. Of particular interest to the present invention are fluids used in vehicle fluid systems, such as fuels, intake air, lubricating oils, transmission, hydraulic and brake fluids, coolants, exhaust gases, window washing fluids, etc., for land-based, aquatic-based, and aerospace vehicles, e.g., passenger cars, trucks, motorcycles, motorized bicycles, airplanes, rockets, and boats, which may be powered by or otherwise with the use of gasoline, diesel, hydrogen, or alcohol mix internal combustion engines, turbine engines, or fuel cells. Furthermore, a variety of fluid properties can be measured with the devices 10, including but not limited to flow rate (including mass and volumetric flow rates), density and properties that can be correlated to density, such as specific gravity, relative chemical concentrations of intended fluid constituents, and the presence of undesirable contaminants such as liquids (e.g., fuel or water in engine oil), gas or air bubbles (e.g., in a fuel or brake fluid), solid particles (e.g., in engine oil), etc.

Figure 7:
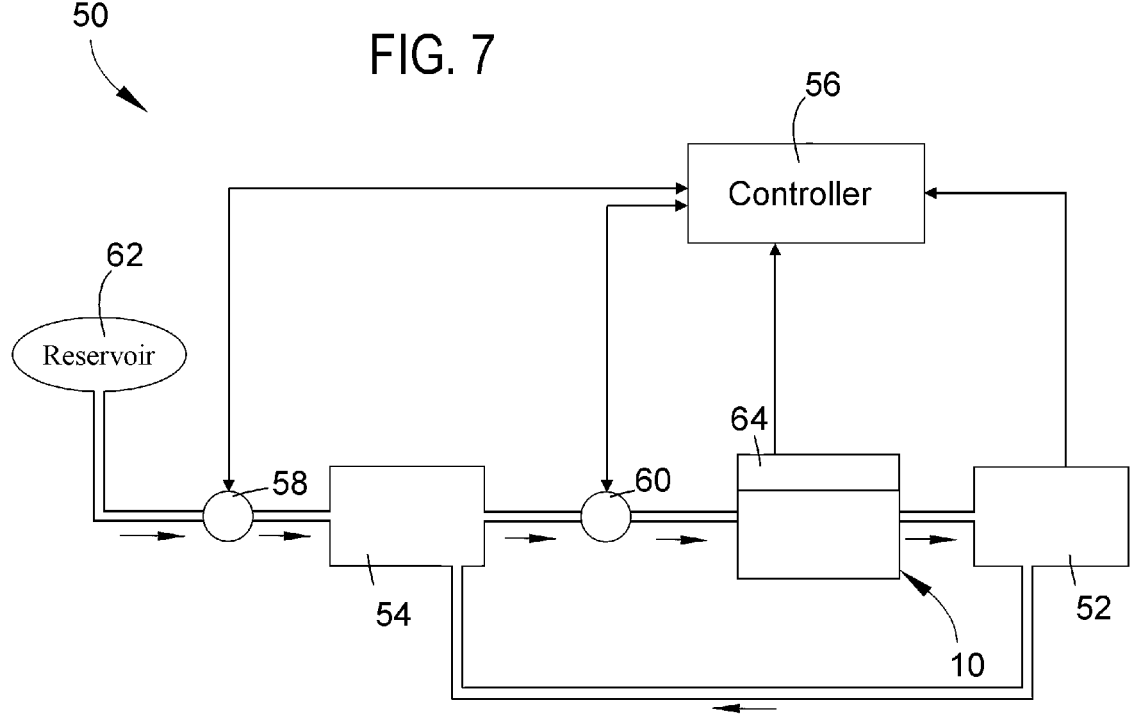
FIG. 7 schematically represents a fluid sensing device of this invention installed in a fluid system of a vehicle.

As a particular example, FIG. 7 schematically represents a fuel cell system 50 containing a fluid sensing device 10 of this invention. The device 10 is installed for sensing the concentration of fuels in a fuel cell solution, such as a mixture of water and methanol, ethanol, ethylene glycol, isopropyl alcohol (IPA), formic acid, sulfuric acid, gasoline, or other organic liquid. The solution is delivered to a fuel cell 52, such as a reformed fuel cell, direct methanol fuel cell (DMFC), or proton exchange membrane (PEM) fuel cell (or PEMFC), which can be adapted to provide power to a vehicle or other device that requires electrical power. As well known in the art, in a fuel cell system it is important to know the concentration of the fuel in the fuel mixture to optimize the efficiency of the system. If a methanol-water mixture is used in the fuel cell 52 of FIG. 7, fluid density of the mixture can be used to determine the concentration of methanol in the mixture, thereby providing feedback for the purpose of controlling the mixing ratio or flow rate of the fuel mixture. FIGS. 9 and 10 are graphs plotting densities of fuel cell solutions containing water and ethanol and ethylene glycol, respectively, at various concentrations. The densities were obtained with fluid sensing devices of the type shown in FIG. 1, and evidence the excellent resolution that can be achieved with resonating microtube-based devices of this invention. Data of the type indicated in FIGS. 9 and 10 can be used to indicate the percentage of fuel to water in the fuel cell system 50 to optimize the efficiency of the fuel cell 52, or otherwise modify the fuel cell system 50 and/or the vehicle in which it is installed, for example, by modifying its operation to improve efficiency, performance and/or safety, signal the status of the fuel cell system 50, etc.

The fluid sensing device 10 of this invention is shown mounted to a line carrying a fuel-water mixture from a mixing chamber 54 to the fuel cell 52. With reference to FIGS. 2 through 4 and 6, the line carrying the mixture to the device 10 would be connected to the inlet passage 26 and the line carrying the mixture from the device 10 to the fuel cell 52 would be connected to the outlet passage 28. Control circuitry 64 noted above as useful or required by the invention is represented as being fabricated on a chip that can be mounted or otherwise appropriately coupled to the device 10 in any suitable manner. Based on the motion of the freestanding portion 16 of the tube 14 sensed by the sensing electrodes 24, the control circuitry 64 is able to produce one or more outputs corresponding to at least the density of the fuel mixture flowing through the tube 14, and optionally the mass flow rate, volumetric flow rate, specific gravity, etc., of the fuel mixture. This output can then be used to compute the concentration of methanol in the mixture, either by the control circuitry 64 or a system controller 56. The controller 56 is represented as communicating with both the device 10 and fuel cell 52, and as controlling pumps 58 and 60 that deliver the fuel from a reservoir 62 to the mixing chamber 54 and from the mixing chamber 54 to the fluid sensing device 10, respectively. The components illustrated in FIG. 7 are for illustration only, and those skilled in the art will appreciate that the fluid sensing devices 10 of this invention can be used in combination with a variety of other components and sensors, including hot-wire technology to measure the mixture flow rate and pressure sensors to measure the fuel pressure in the system 50. Notably, these additional sensors can be placed directly in the bypass passage 40 of this invention, as represented by a sensor element 66 in the bypass passage 40 of FIG. 5.

Figure 8:
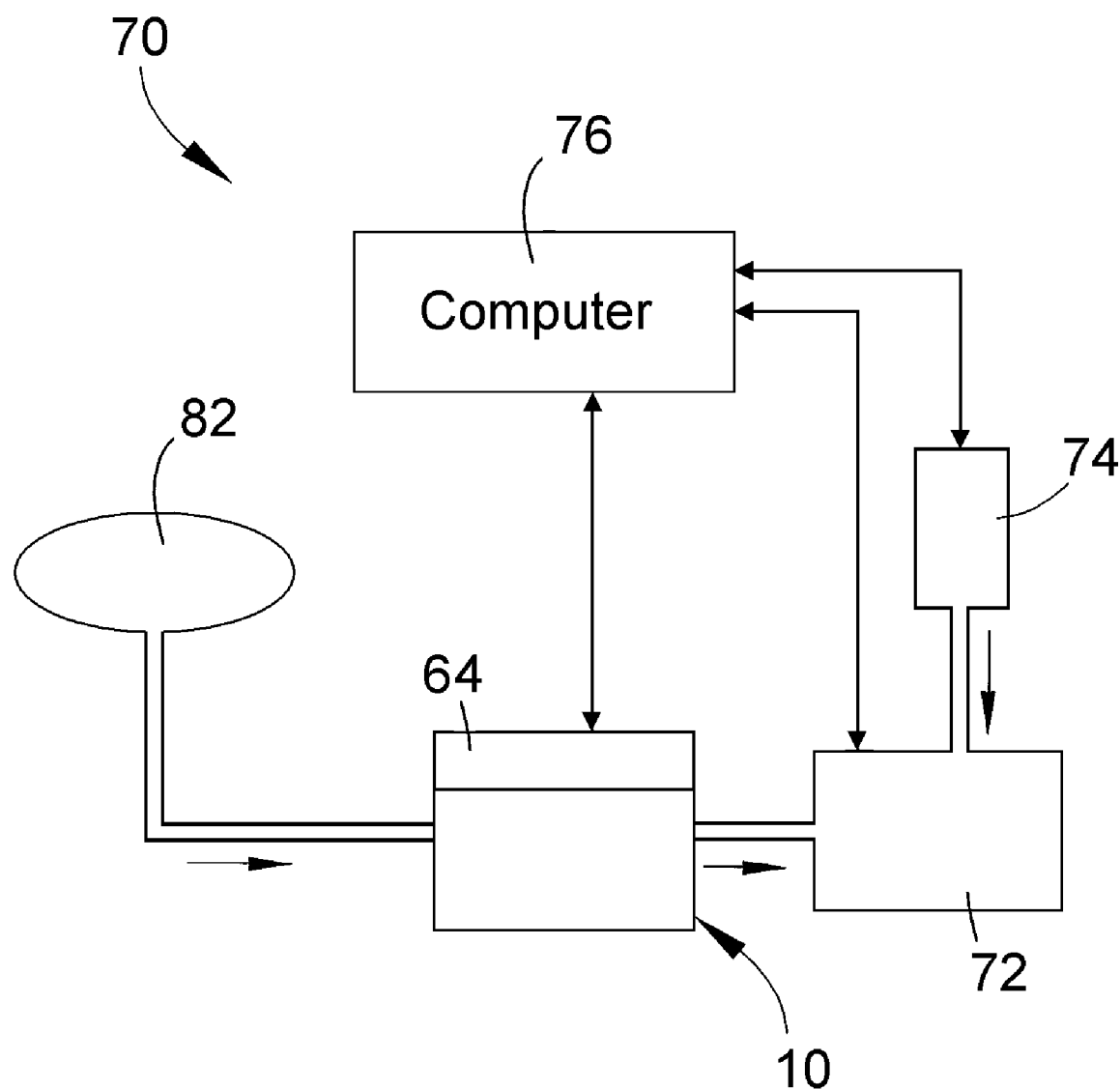
FIG. 8 schematically represents a fluid sensing device of this invention installed in a fuel cell system of a vehicle.

FIG. 8 schematically represents another fuel-related application for the invention as a fuel system 70 adapted to combust a fuel mixture, such as a mixture of gasoline and an alternative fuel such as ethanol (e.g., E85) or methanol (e.g., M85). Vehicles equipped to burn fuels such as E85 and M85 are also typically capable of burning ordinary gasoline, with the result that the fuel contained in the vehicle's fuel tank 82 at any given time may be nearly 100% gasoline, 100% E85 or M85, or a mixture in between. The fluid sensing device 10 of this invention is installed to sense the fluid density of the fuel mixture, which in turn can be used to compute the relative concentrations of gasoline and the alternative fuel in the fuel mixture prior to being delivered to an engine 72. The output of the device 10 is preferably sent to an on-board engine control computer 76 which, with air intake flow data obtained from the air intake system 74 of the engine 72 (e.g., with a second device 10), can modify if necessary the operation of the engine 72 for the particular fuel mixture, as well as improve the performance of the engine 72, signal the status of the fuel system 70, etc. FIG. 11 is a graph plotting data obtained from fuel mixtures with various ethanol to gasoline concentrations using a fluid sensing device of the type shown in FIG. 1. The device was able to achieve a resolution of about 1% for ethanol to gasoline concentrations, which is sufficient to differentiate between pure gasoline (density of about 0.7329 gm/cc) and E85 (density of about 0.7806 gm/cc). A similar capability can be achieved with other fuel mixtures, such as fuel mixtures of methanol (density of about 0.7870 gm/cc) to differentiate between pure gasoline and M85 (density of about 0.7816 gm/cc).

The fluid system 70 of FIG. 8 is representative of the manner in which a device 10 of this invention can be installed in a variety of vehicle fluid systems, such as those mentioned above. Therefore, while the invention has been described in terms of certain embodiments, it is apparent that other forms could be adopted by one skilled in the art, and the scope of the invention is to be limited only by the following claims.

The invention claimed is:

1. A method of assessing a property of a fluid flowing in a fluid system installed on a vehicle, the method comprising the steps of:
    flowing at least a portion of the fluid through a passage within a freestanding portion of a micromachined tube supported above a substrate so as to define a gap therebetween;
    vibrating the freestanding portion of the micromachined tube at a resonant frequency thereof;
    sensing the movement of the freestanding portion of the micromachined tube so as to measure at least one of the vibration frequency and deflection of the freestanding portion relative to the substrate and produce therefrom at least one output corresponding to at least one of the mass flow rate, specific gravity, and density of the portion of the fluid flowing through the passage;
    using the output to compute the property of the fluid; and then
    modifying at least one of the fluid system and the vehicle based on the computed property of the fluid.

2. The method according to claim 1, wherein the output corresponds to the density of the fluid, and the output is used to compute relative concentrations of at least two constituents of the fluid.

3. The method according to claim 2, wherein the fluid system is a fuel system of the vehicle and the fluid is a fuel mixture comprising the at least two constituents.

4. The method according to claim 3, wherein the fuel system is a fuel cell system of the vehicle, the fluid mixture is a fuel cell solution, and the computed property of the fluid is used to modify the performance of the fuel cell system.

5. The method according to claim 4, wherein the at least two constituents comprise water and a fuel chosen from the group consisting of methanol, ethanol, ethylene glycol, isopropyl alcohol, formic acid, sulfuric acid, gasoline, and organic liquids.

6. The method according to claim 3, wherein the fuel system delivers the fuel mixture to an engine of the vehicle, the at least two constituents comprise gasoline and a fuel chosen from the group consisting of methanol and ethanol, and the computed property of the fluid is used to modify the performance of the engine.

7. The method according to claim 1, wherein the fluid is a liquid, the output corresponds to the density of the liquid, and the output is used to determine the presence of gas bubbles in the liquid.

8. The method according to claim 1, wherein the output corresponds to the density of the fluid, and the output is used to determine the presence of solid particles in the fluid.

9. The method according to claim 1, wherein the fluid system is an engine air intake system of the vehicle, the fluid is an air mixture comprising at least two constituents, and the output is used to compute at least one of the volumetric flow rate and mass flow rate of the air mixture and the relative concentrations of the constituents of the air mixture.

10. The method according to claim 1, wherein the fluid system is an engine oil system of the vehicle, the fluid is a lubricating oil comprising at least two constituents, and the output is used to compute at least one of the volumetric flow rate and mass flow rate of the lubricating oil and the relative concentrations of the constituents of the lubricating oil.

11. The method according to claim 1, wherein the fluid system is a transmission system of the vehicle, the fluid is a transmission fluid comprising at least two constituents, and the output is used to compute at least one of the volumetric flow rate and mass flow rate of the transmission fluid and the relative concentrations of the constituents of the transmission fluid.

12. The method according to claim 1, wherein the fluid system is a braking system of the vehicle, the fluid is a braking fluid comprising at least two constituents, and the output is used to compute at least one of the volumetric flow rate and mass flow rate of the braking fluid and the relative concentrations of the constituents of the braking fluid.

13. The method according to claim 1, wherein the fluid system is a cooling system of the vehicle, the fluid is a coolant fluid comprising at least two constituents, and the output is used to compute at least one of the volumetric flow rate and mass flow rate of the coolant fluid and the relative concentrations of the constituents of the coolant fluid.

14. The method according to claim 1, wherein the fluid system is an exhaust system of the vehicle, the fluid is an exhaust gas comprising at least two constituents, and the output is used to compute at least one of the volumetric flow rate and mass flow rate of the exhaust gas and the relative concentrations of the constituents of the exhaust gas.

15. The method according to claim 1, wherein the fluid system is a window washing system of the vehicle, the fluid is a window washing fluid comprising at least two constituents, and the output is used to compute at least one of the volumetric flow rate and mass flow rate of the window washing fluid and the relative concentrations of the constituents of the window washing fluid.

16. The method according to claim 1, further comprising the step of sensing the temperature of the portion of the fluid flowing through the passage.

17. The method according to claim 1, further comprising the step of sensing the pressure of the portion of the fluid flowing through the passage.

18. A method according to claim 1, further comprising the step of flowing a second portion of the fluid through a bypass passage in fluidic parallel to the passage within the freestanding portion, wherein the second portion has a greater volumetric flow rate than the portion of the fluid flowing through the passage within the freestanding portion.

19. The method according to claim 1, wherein the vehicle is chosen from the group consisting of land-based, aerospace, and aquatic-based vehicles.

20. A fluid system installed on a vehicle, the fluid system comprising:
    means for flowing at least a portion of the fluid through a passage within a freestanding portion of a micromachined tube supported above a substrate so as to define a gap therebetween;
    means for vibrating the freestanding portion of the micromachined tube at a resonant frequency thereof;
    means for sensing the movement of the freestanding portion of the micromachined tube so as to measure at least one of the vibration frequency and deflection of the freestanding portion relative to the substrate and produce therefrom at least one output corresponding to at least one of the mass flow rate, specific gravity, and density of the portion of the fluid flowing through the passage;
    means for using the output to compute the property of the fluid; and
    means for modifying at least one of the fluid system and the vehicle based on the computed property of the fluid.

21. The fluid system according to claim 20, wherein the output corresponds to the density of the fluid, and the using means computes relative concentrations of at least two constituents of the fluid.

22. The fluid system according to claim 21, wherein the fluid system is a fuel system of the vehicle and the fluid is a fuel mixture comprising the at least two constituents.

23. The fluid system according to claim 22, wherein the fuel system is a fuel cell system of the vehicle and the fluid mixture is a fuel cell solution, and the fuel system further comprises means for modifying the performance of the fuel cell system using the computed property of the fluid.

24. The fluid system according to claim 23, wherein the at least two constituents comprise water and a fuel chosen from the group consisting of methanol, ethanol, ethylene glycol, isopropyl alcohol, formic acid, sulfuric acid, gasoline, and organic liquids.

25. The fluid system according to claim 22, wherein the fuel system delivers the fuel mixture to an engine of the vehicle, the at least two constituents comprise gasoline and a fuel chosen from the group consisting of methanol and ethanol, and the fuel system further comprises means for modifying the performance of the engine using the computed property of the fluid.

26. The fluid system according to claim 20 wherein the fluid is a liquid, the output corresponds to the density of the liquid, and the using means determines the presence of gas bubbles in the liquid.

27. The fluid system according to claim 20, wherein the output corresponds to the density of the fluid, and the using means determines the presence of solid particles in the fluid.

28. The fluid system according to claim 20, wherein the fluid system is an engine air intake system of the vehicle, the fluid is an air mixture comprising at least two constituents, and the using means computes at least one of the volumetric flow rate and mass flow rate of the air mixture and the relative concentrations of the constituents of the air mixture.

29. The fluid system according to claim 20, wherein the fluid system is an engine oil system of the vehicle, the fluid is a lubricating oil comprising at least two constituents, and the using means computes at least one of the volumetric flow rate and mass flow rate of the lubricating oil and the relative concentrations of the constituents of the lubricating oil.

30. The fluid system according to claim 20, wherein the fluid system is a transmission system of the vehicle, the fluid is a transmission fluid comprising at least two constituents, and the using means computes at least one of the volumetric flow rate and mass flow rate of the transmission fluid and the relative concentrations of the constituents of the transmission fluid.

31. The fluid system according to claim 20, wherein the fluid system is a braking system of the vehicle, the fluid is a braking fluid comprising at least two constituents, and the using means computes at least one of the volumetric flow rate and mass flow rate of the braking fluid and the relative concentrations of the constituents of the braking fluid.

32. The fluid system according to claim 20, wherein the fluid system is a cooling system of the vehicle, the fluid is a coolant fluid comprising at least two constituents, and the using means computes at least one of the volumetric flow rate and mass flow rate of the coolant fluid and the relative concentrations of the constituents of the coolant fluid.

33. The fluid system according to claim 20, wherein the fluid system is an exhaust system of the vehicle, the fluid is an exhaust gas comprising at least two constituents, and the using means computes at least one of the volumetric flow rate and mass flow rate of the exhaust gas and the relative concentrations of the constituents of the exhaust gas.

34. The fluid system according to claim 20, wherein the fluid system is a window washing system of the vehicle, the fluid is a window washing fluid comprising at least two constituents, and the using means computes at least one of the volumetric flow rate and mass flow rate of the window washing fluid and the relative concentrations of the constituents of the window washing fluid.

35. The fluid system according to claim 20, further comprising means for sensing the temperature of the portion of the fluid flowing through the passage.

36. The fluid system according to claim 20, further comprising means for sensing the pressure of the portion of the fluid flowing through the passage.

37. A fluid system according to claim 20, further comprising means for flowing a second portion of the fluid through a bypass passage in fluidic parallel to the passage within the freestanding portion, wherein the second portion has a greater volumetric flow rate than the portion of the fluid flowing through the passage within the freestanding portion.

38. The fluid system according to claim 20, wherein the vehicle is chosen from the group consisting of land-based, aerospace, and aquatic-based vehicles.

* * * * *